(12) United States Patent
Kuroda et al.

(10) Patent No.: US 8,031,581 B2
(45) Date of Patent: Oct. 4, 2011

(54) OPTICAL DISC AND OPTICAL DISC DEVICE

(75) Inventors: Kazuo Kuroda, Yokohama (JP); Eiji Muramatsu, Kiyose (JP)

(73) Assignee: Pioneer Corporation, Tokyo (JP)

( * ) Notice: Subject to any disclaimer, the term of this patent is extended or adjusted under 35 U.S.C. 154(b) by 15 days.

(21) Appl. No.: 12/600,366

(22) PCT Filed: May 15, 2007

(86) PCT No.: PCT/JP2007/000520
§ 371 (c)(1),
(2), (4) Date: Dec. 1, 2009

(87) PCT Pub. No.: WO2008/139510
PCT Pub. Date: Nov. 20, 2008

(65) Prior Publication Data
US 2010/0149944 A1    Jun. 17, 2010

(51) Int. Cl.
*G11B 7/24* (2006.01)
*G11B 7/20* (2006.01)
(52) U.S. Cl. .................... 369/275.2; 369/94
(58) Field of Classification Search ............ 369/100, 369/108, 275.2, 275.4, 94; 347/224, 241, 347/256; 428/64.4, 64.8
See application file for complete search history.

(56) References Cited

U.S. PATENT DOCUMENTS

| 7,268,794 | B2* | 9/2007 | Honda et al. | 347/224 |
| 2006/0028967 | A1* | 2/2006 | Tsukihashi et al. | 369/275.1 |
| 2006/0204894 | A1* | 9/2006 | Kobayashi et al. | 428/64.8 |
| 2007/0025225 | A1 | 2/2007 | Mori | |
| 2007/0269652 | A1* | 11/2007 | Kubo | 428/332 |
| 2007/0291103 | A1* | 12/2007 | Yamada et al. | 347/241 |
| 2007/0298206 | A1* | 12/2007 | Marshall et al. | 428/64.4 |

FOREIGN PATENT DOCUMENTS

| JP | 11-305204 | 11/1999 |
| JP | 2002-074757 | 3/2002 |
| JP | 2002-195910 | 7/2002 |
| JP | 2005-317057 | 11/2005 |
| JP | 2005-339643 | 12/2005 |
| JP | 2006-228354 | 8/2006 |
| JP | 2007-035194 | 2/2007 |
| WO | WO 2005/104100 | 11/2005 |

OTHER PUBLICATIONS

International Search Report, PCT/JP2007/000520, Aug. 21, 2007.

* cited by examiner

*Primary Examiner* — Thang Tran
(74) *Attorney, Agent, or Firm* — Young & Thompson

(57) ABSTRACT

Provided herein is an optical disc having: an optical plotting layer 17 which is formed at a label surface B-side and on which an image is formed by heat change with a laser beam 28 emitted from a recording surface A-side; a protective layer 18 which is formed at the label surface B-side of the optical plotting layer 17, protects the optical plotting layer 17, and through which the image can be viewed from the label surface B-side; a substrate 15 which supports the protective layer 18 and the optical plotting layer 17; and a guide track 24 which is formed on the optical plotting layer 17 so as to be intermittent in a guide direction.

12 Claims, 8 Drawing Sheets

F I G. 3
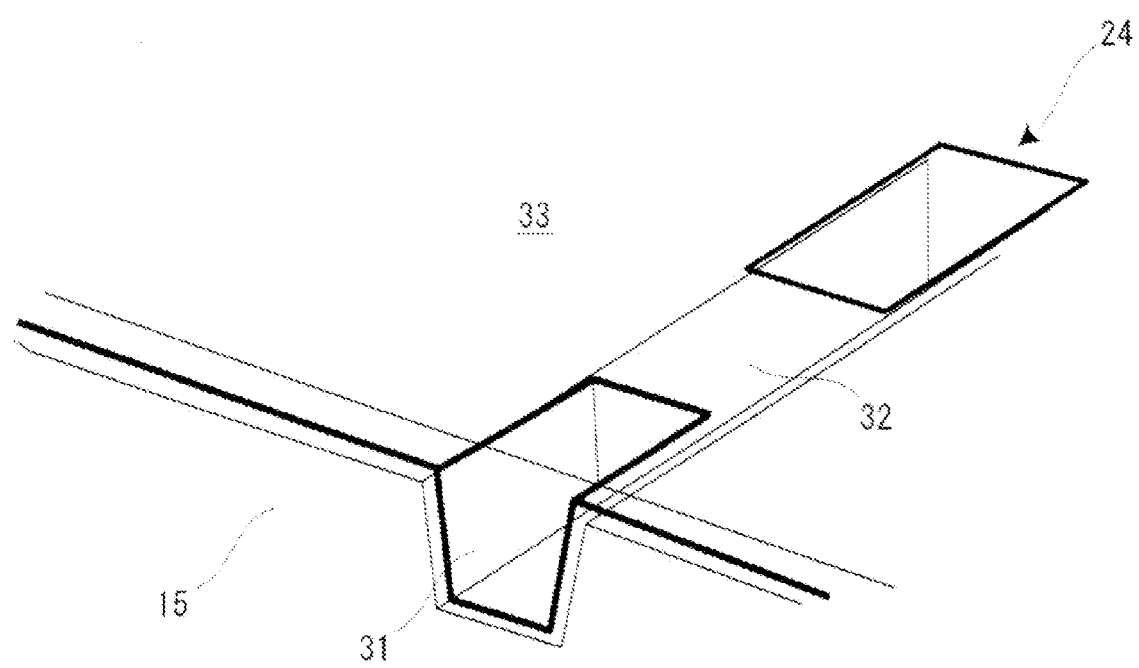

OPTICAL DISC AND OPTICAL DISC DEVICE

TECHNICAL FIELD

The present invention relates to an optical disc having an optical plotting layer at a label surface side on which an image can be plotted with a laser beam from a recording surface side and an optical disc apparatus therefor.

BACKGROUND ART

A known optical disc which can be plotted on a label surface thereof with a laser beam has, from a recording surface side, the first substrate, an information recording layer, a reflective layer, an adhesive layer, the second substrate, an image recording layer and a protective layer in layers (for example, Patent Document 1). In this case, a visible image is plotted on the image recording layer with a CD (Compact Disc) laser beam, while the information recording layer is tracked by a DVD (Digital Versatile Disc) laser beam.
[Patent Document 1] JP-A-2005-196917

DISCLOSURE OF THE INVENTION

Problems to be Solved

In such a known optical disc, as the image recording layer is plotted while the information recording layer is tracked, the tracking laser beam needs to be focused on the information recording layer. In this case, if the information recording layer and a plotting layer are apart from each other, there is a possibility that the laser beam focused on the information recording layer could be defocused on the plotting layer. The information recording layer and the plotting layer must be close enough to be focused by which sufficient heat quantity can be obtained with the laser beam emitted on the plotting layer, even in a state that the laser beam is focused on the information recording layer. But, if an information recording apparatus is close to the plotting layer, heat generated when information is recorded on the information recording layer could be transmitted to the plotting layer, leading to a possibility to overwrite an image and the like already plotted by impacting pigments in the plotting layer. There arises a problem in which colors blur around an emitted point of a laser beam because of thermal diffusion via a guide track around the emitted point of the laser beam.

Further, a track pitch of the DVD is 0.74 µm and a track pitch of the CD is 1.6 µm. When the optical disc is tracked at the DVD track pitch and is plotted with the CD beam, an image is overwritten and power control may become complex and difficult with defocus. Despite that there is a CD broad beam, if the optical disc is tracked with the DVD, it comes up with a disadvantage of time-consuming because of the overwrite.

There is an advantage of the invention is to provide an optical disc on which a clear image without blur can be accurately formed with a laser beam from a recording surface side and an optical disc apparatus therefor.

Means to Solve the Problems

The invention provides an optical disc which includes: an optical plotting layer which is formed at a label surface side and on which an image is formed by heat change with a laser beam emitted from a recording surface side; a protective layer which is formed at the label surface side of the optical plotting layer, protects the optical plotting layer, and through which the image can be viewed from the label surface side; a substrate which supports the protective layer and the optical plotting layer; and a guide track which is formed on the optical plotting layer so as to be intermittent in a guide direction. Heat sensitive material forming the optical plotting layer is formed on a plurality of concave portions of the guide track.

According to the configuration, it is possible to plot accurately by using the guide track as tracking and focusing for plotting. Further, it is possible to plot a clear image without line blur (fuzziness) by changing the optical plotting layer in the guide track by heat. It is preferable that leuco dye/long-chain type developer, cholesteric liquid crystal (for color) and the like be used as heat sensitive material of the optical plotting layer. Further, it is possible to make a plurality of concave portions of the guide track function as pixels in the image, leading to clear plotting without line blur (fuzziness). In other words, it is possible to increase resolution of the image.

In this case, it is preferable that a reflective layer capable of transmitting a visible light further be provided between the protective layer and the optical plotting layer.

According to this configuration, it is possible to obtain a sufficient reflective light and to make visibility of a plotting result for sure, by using the guide track as tracking and focusing for plotting. Further, it is possible to change the optical plotting layer by heat properly.

Likewise, it is preferable that a reflective layer be further provided between the optical plotting layer and the substrate.

According to this configuration, it is possible to enhance the visibility of the plotting result and to change the optical plotting layer by heat properly by heating the reflective layer with an optical spot and transferring the heat to the optical plotting layer (a heat transfer between solid substances).

Further, it is preferable that a bonded substrate laminated at the recording surface side of the substrate and an information recording layer formed at a bonded side of the bonded substrate be further provided and the information recording layer have a wavelength selectivity transmitting reflective film.

Likewise, it is preferable that an information recording layer formed at the recording surface side of the substrate be further provided and the information recording layer have a wavelength selectivity transmitting reflective film.

According to this configuration, even if the optical plotting layer and the information recording layer are formed overlappingly, it is possible to plot on the optical plotting layer adequately by using a laser beam of which wavelength is different from that used for recording on/producing from the information recording layer. For example, in a case of a DVD-R (650 nm), it is possible to plot with a CD laser beam (780 nm), and in a case of a Blue-ray Disc (405 nm), it is possible to plot with a DVD laser beam (650 nm) and the CD laser beam (780 nm).

In this case, it is preferable that the protective layer and the optical plotting layer be formed in an area other than a data area.

According to the configuration, as the information recording layer and the like for recording/reproduction and the optical plotting layer are not overlapped, it is possible to plot on the optical plotting layer without giving any influence on the information recording layer (the reflective layer) and the like.

In this case, it is preferable that the optical plotting layer be made up of heat sensitive material mixed with a metallic particle.

According to this configuration, it is possible to enhance thermal absorbability of the optical plotting layer and to promote thermal change.

In this case, it is preferable that the protective layer serve as a print layer capable of being printed by a printing apparatus.

According to this configuration, it is possible to plot on the optical plotting layer with the beam and to plot on the protective layer by the printing apparatus. Therefore, a user can select which plotting type may be used. Accordingly, it is possible to enhance flexibility of the plotting type which is viewable from the label surface side.

Likewise, it is preferable that the protective layer serve as a print layer capable of being printed by the printing apparatus, and color of non-plotted optical plotting layer be tinged with white.

According to the configuration, as the optical plotting layer to be ground color is tinged, even if the printing apparatus performs printing, it is possible to obtain a plotting result having sufficient contrast against a plotting result printed on the protective layer.

The invention provides an optical disc apparatus which is introduced with the optical disc described above, emits a laser beam on an information recording layer to record and/or reproduce information, and emits a laser beam on an optical plotting layer to plot an image.

According to the configuration, it is possible to form an arbitrary image viewable from the label surface side on the optical disc by using a recording/reproducing laser beam, a drive system and a control system of the optical disc.

In this case, it is preferable that wavelengths of the laser beam emitted on the information recording layer and of the laser beam emitted on the optical plotting layer be different each other.

According to this configuration, it is possible to record on/reproduce from the optical disc and to plot (form an image) thereon in a state that mutual influence is excluded as much as possible.

In this case, the image is plotted by emitting the laser beam on the optical plotting layer based on the guide track.

According to the configuration, it is possible to obtain an image having high plotting accuracy and high plotting quality.

BRIEF DESCRIPTION OF THE DRAWINGS

FIG. 3 is a partially enlarged perspective view around a plotting guide track.

REFERENCE NUMERALS

| 1 | optical disc apparatus |
| 2 | optical pickup |
| 11 | first substrate |
| 12 | information recording layer |
| 13 | first reflective layer |
| 15 | second substrate |
| 16 | second reflective layer |
| 17 | optical plotting layer |
| 18 | protective layer |
| 24 | plotting guide track |
| 25 | image forming layer |
| 27 | DVD laser beam |
| 28 | CD laser beam |
| 31 | concave portion |
| 32 | flat portion |
| 33 | land |
| 41 | information recording layer |
| 42 | first reflective layer |
| 43 | substrate |
| 44 | second reflective layer |
| 45 | optical plotting layer |
| 46 | protective layer |
| 54 | plotting guide track |
| 57 | BD laser beam |
| 61 | data area |
| 62 | clamp area |
| A | recording surface |
| B | label surface |
| D, Da, Db, Dc | optical disc |

BEST MODES FOR CARRYING OUT THE INVENTION

An optical disc and an optical disc apparatus of the invention will be explained hereinbelow with reference to accompanying drawings. The optical disc is configured with, for example, a DVD-R or a Blu-ray Disc, and has an information recording layer on which information is recorded/reproduced and an optical plotting layer on which a title name of the recorded information or a notation such as "DVD-ROM" after finalization is visibly plotted. The optical disc apparatus has a function of recording/reproducing on a CD or a DVD (a Blu-ray Disc) and is configured to be able to plot a desired image on the optical plotting layer of the optical disc by using the function.

Figure 1:
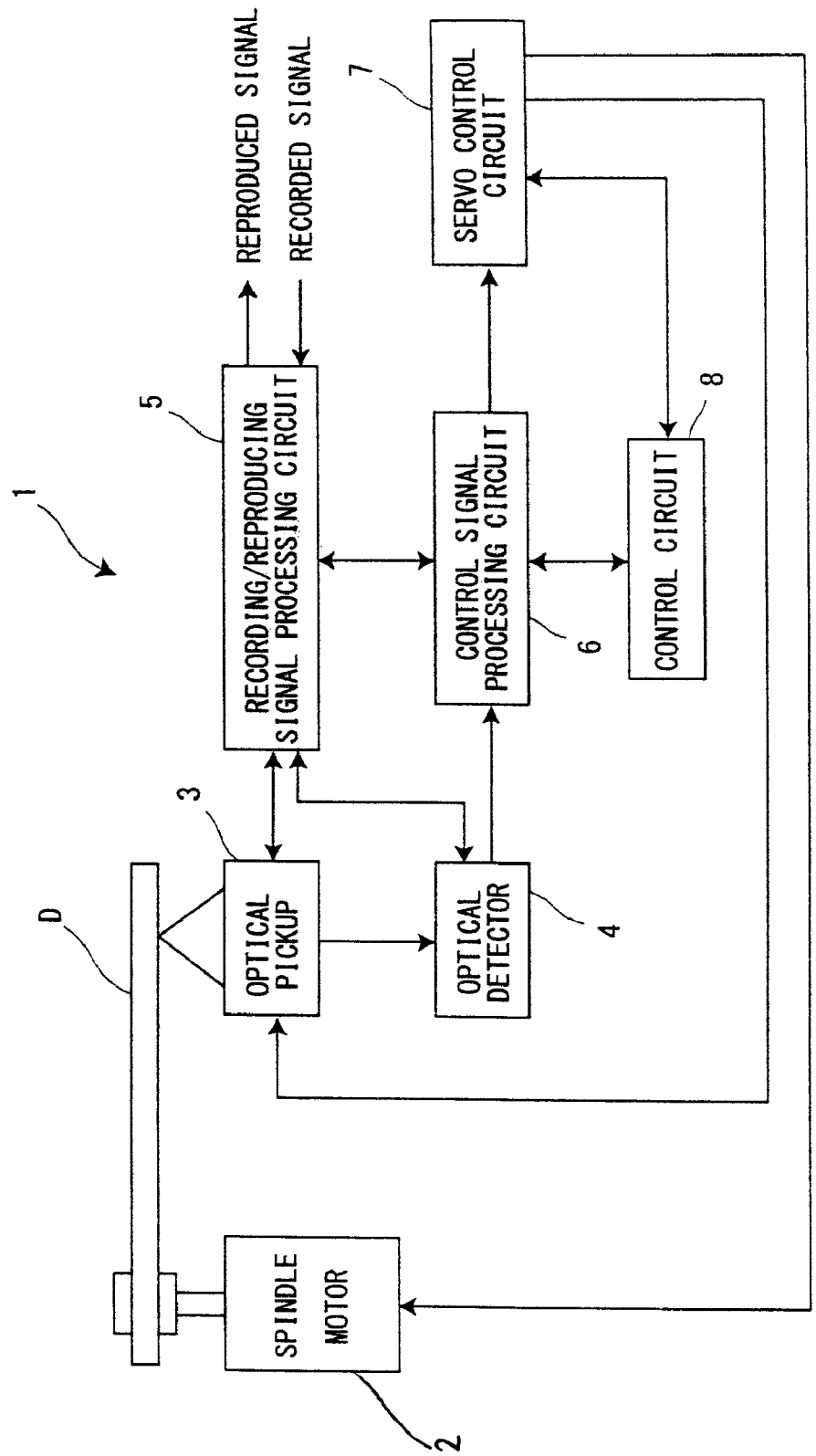
FIG. 1 is a block diagram of an optical disc apparatus according to an embodiment.

As shown in FIG. 1, the optical disc apparatus 1 has: a spindle motor 2 which rotates an optical disc D; an optical pickup 3 which emits a laser beam on the optical disc D; an optical detector 4 which detects a reflective light from the optical disc D; a recording/reproducing signal circuit 5 which controls the laser beam; a control signal processing circuit 6 which generates control signals such as a tracking error signal and a focus error signal based on a detected result of the optical detector 4; a servo control circuit 7 which controls the optical pickup 3 based on the control signals generated by the control signal processing circuit 6; and an integral control circuit 8 which controls overall.

The spindle motor 2 rotates the optical disc D at a constant angular velocity (CAV) or at a constant linear velocity (CLV). The optical pickup 3 emits the laser beam functioning as a recording beam or a reproducing beam from a recording surface side of the optical disc D and transmits the reflective light from the recording surface side to the optical detector 4. In this case, the optical pickup 3 includes, for example, a CD semi-conductor laser (the wavelength thereof is 780 nm), a DVD semi-conductor laser (the wavelength thereof is 650 nm) and a Blue-ray Disc semi-conductor laser (the wavelength thereof is 405 nm) as a laser source. The optical pickup 3 also has an optical system including an objective lens, a focus actuator, a track actuator, a light-sensitive element (the optical detector 4), a position sensor and the like (not shown).

The optical detector 4 converts the reflective light received from the optical pickup 3 to an electrical signal (a detected signal) and outputs it to the recording/reproducing signal circuit 5 and the control signal processing circuit 6. The recording/reproducing signal circuit 5 receives a recording signal at the time of recording on the optical disc D and outputs it to the optical pickup 3 after an encoding process and a modulation process are processed thereon. At the time of reproducing on the optical disc D, the recording/reproducing signal circuit 5 gives an encoding process and a D/A conversion process and the like on the detected signal input from the optical detector 4 and outputs it as an reproduction signal to a video image output unit and an audio output unit (not shown).

The control signal processing circuit 6 receives the detected signal from the optical detector 4, generates control signals for tracking servo, focus servo and the like, and outputs it to the servo control circuit 7 and the integral control circuit 8. The servo control circuit 7 generates a drive control signal for controlling the spindle motor 2 and the optical pickup 3 based on the tracking error signal, the focus error signal and the like input from the control signal processing circuit 6, and outputs it to the spindle motor 2 and the optical pickup 3. The integral control circuit 8 has a CPU and controls respective component units comprehensively based on a prepared program.

When the optical disc D is recorded, the optical disc D is tracked based on the tracking error signal generated from the detected signal of the optical detector 4 and a mark is formed on the information recording layer 12 with a strong laser power beam (a recording beam) for recording. Further, when the optical disc D is reproduced, a weak laser power beam (a reproducing beam) is emitted on the optical disc D, the reflective light thereof is detected by the optical detector 4, and the recorded information is read out based on the detected signal for reproduction.

Figure 2:
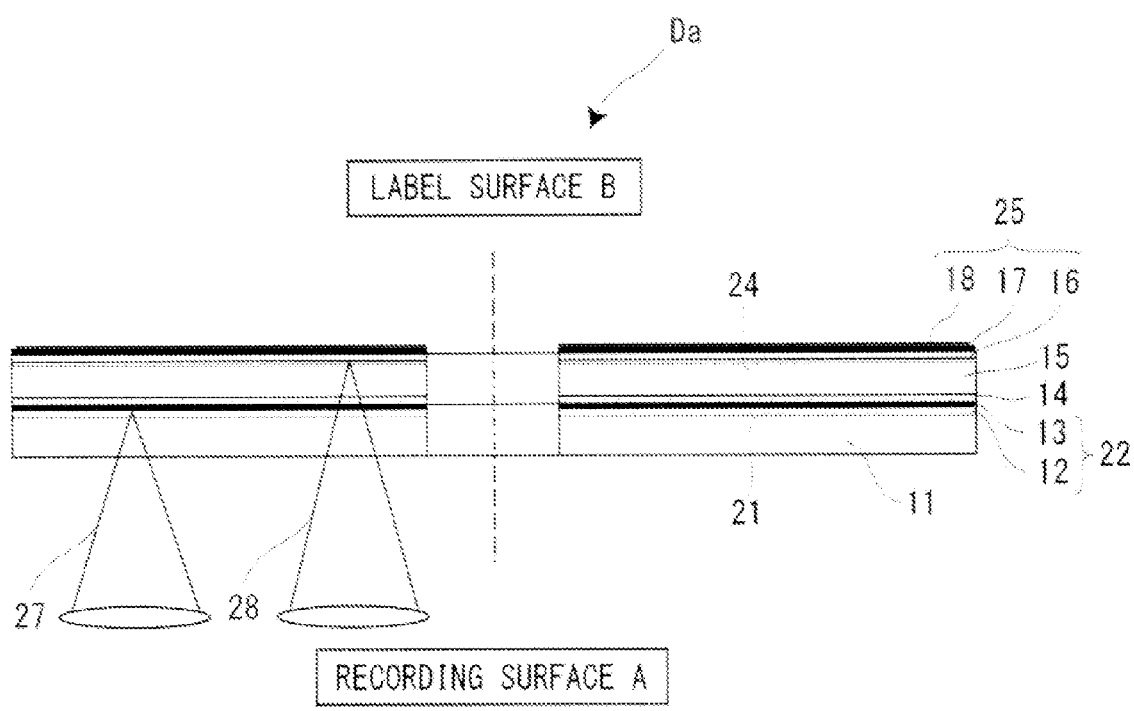
FIG. 2 is a diagramic sectional view of an optical disc (a DVD-R) of the embodiment.

As shown in FIG. 2, an optical disc Da made up of a DVD-R has, from a recording surface A-side, the first substrate (a bonded substrate) 11, an information recording layer 12, the first reflective layer 13, an adhesive layer 14, the second substrate (a substrate) 15, the second reflective layer 16, an optical plotting layer 17 and a protective layer 18 in layers. It is preferable that the second substrate (the substrate) 15 have a thickness by which heat generated at the time of recording information on the information recording layer 12 does not affect the optical plotting layer 17. A recording/reproducing guide track 21 is formed on the information recording layer 12, and a DVD layer 22 for recording/reproducing with the DVD semi-conductor laser is formed with the information recording layer 12 and the first reflective layer 13. Likewise, a plotting guide track 24 is formed on the optical plotting layer 17, and an image forming layer 25 for plotting with the CD semi-conductor laser is made up of the second reflective layer 16, the optical plotting layer 17 and the protective layer 18. Note that the DVD layer 22 may have two layers (multiple layers).

The first substrate 11 is formed with polycarbonate or the like. The information recording layer 12 is formed with organic coloring material and when a DVD laser beam 27 is emitted, it is metamorphosed and a so-called pit is formed thereon. The DVD laser beam 27 (650 nm) emitted from the optical pickup 3 tracks on the recording/reproducing guide track 21. The first reflective layer 13 is configured of a metallic film or the like constituted by a wavelength selectivity transmitting reflective film. The reflective layer 13 reflects the DVD laser beam 27 transmitted through the first substrate 11 and the information recording layer 12 while transmitting a CD laser beam 28 (780 nm).

The second substrate 15 is formed with polycarbonate or the like. The second reflective layer 15 is made up of a metallic film such as gold, silver or aluminum. The second reflective layer 15 reflects the CD laser beam 28 transmitted through the first substrate 11, the information recording layer 12, the first reflective layer 13, the adhesive layer 14 and the second substrate 15 while reflecting a visible light transmitted through the protective layer 18 and the optical plotting layer 17 from a label surface B-side. The optical plotting layer 17 is configured to form an image thereon by heat sensitive change (heat discoloration) with the CD laser beam 28 from the recording surface A-side, and is made up of heat sensitive material such as, for example, leuco dye/long-chain type developer and cholesteric liquid crystal (for color images). In this case, it is preferable that metallic particles be mixed with the heat sensitive material so as to enhance heat absorbability (optical absorbability). The CD laser beam 28 emitted from the optical pickup 3 tracks on the plotting guide track 24.

The protective layer 18 protects the optical plotting layer 17 and is made up of transparent or translucent protective material. The protective layer 18 is so configured that the image formed on the optical plotting layer 17 can be viewed from the label surface B-side. The protective layer 18 also serves as a print layer having ink retentive force and the surface thereof may be printed by a dedicated printer (a printing apparatus). In other words, the optical disc Ca in the embodiment is so configured that the CD laser beam 28 can plot on the optical plotting layer 17 from the recording surface A-side and the printer (for example, an ink jet printer) can plot on the protective layer 18 from the label surface B-side. It is preferable that color of the optical plotting layer 17 be tinged with white so as to enhance visibility of a plotted result by the printer. The CD laser beam 28 plots, needless to say, so-called mirror letters and the printer plots normal image letters.

Figure 4A:
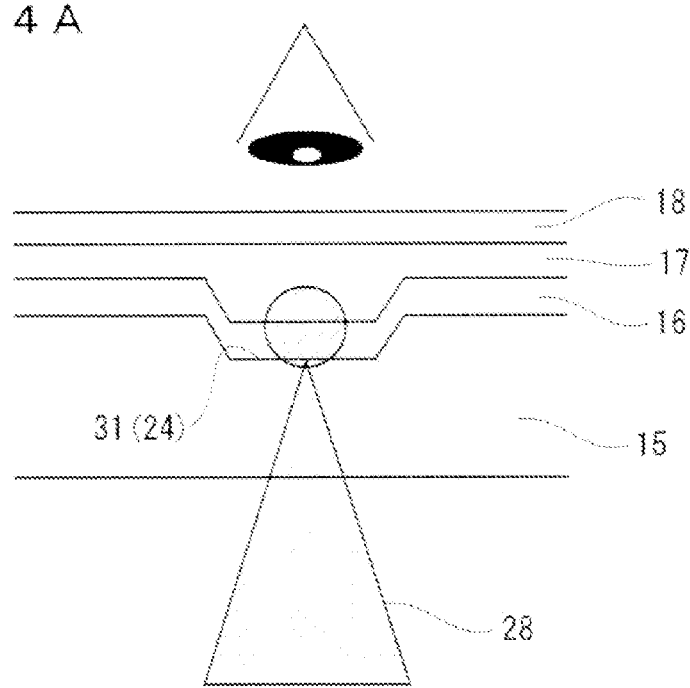
FIGS. 4A and 4B are enlarged sectional views around the plotting guide track.
Figure 4B:
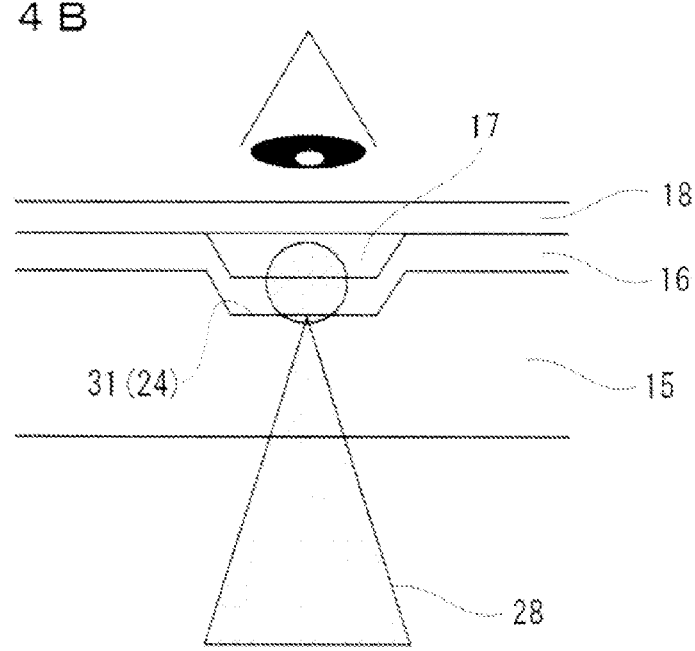

As shown in FIGS. 3, 4A and 4B, the plotting guide track 24 is formed in a guide direction (an extended direction) intermittently, that is, concave portions 31 and flat portions 32 are formed alternatively and successively in the guide direction. The surface of the second substrate 15 has numerous concave portions 31, numerous flat portions 32 and a land 33. The film-like second reflective layer 16 is formed thereon. As shown in FIG. 4B, it is preferable that the heat sensitive material of the optical plotting layer 17 be formed only on the numerous concave portions 31, but as shown in FIG. 4A, it may be formed on the numerous concave portions 31, the numerous flat portions 32 and the land 33. Thus, when the laser beam is emitted for coloring the heat sensitive material formed on the concave portions 31, thermal diffusion around an emitted point of the laser beam discontinues by physically making the plotting guide track in an intermittent shape. Therefore, it is possible to plot a sharp image having less blur. The discontinuity of the guide track may be formed with a concavo-convex shape in the grooves. Further, it may be formed by pits which are formed in the track. It is preferable that the guide track be separated evenly dispersedly at a predetermined unit (a minimum pit length unit or a sector address, an ECC block address unit).

The plotting operation is performed with the CD laser beam 28 emitted on a desired position of the optical plotting layer 17 (the second reflective layer 16) based on plotting data while the CD laser beam 28 tracks on the plotting guide track 24. Specifically, the CD laser beam 28 is transmitted through the first substrate 11, the information recording layer 12 and the first reflective layer 13, and the reflective light of the CD laser beam 28 emitted on the plotting guide track 24 of the optical plotting layer 17 is detected by the above optical detector 4. Then, the control signal processing circuit 6 generates a tracking servo control signal based on the detected signal. The servo control circuit 7 moves the objective lens for tracking by a lens actuator (not shown) based on the tracking error signal. Thus, the CD laser beam 28 can accurately track on the plotting guide track 24 and can plot at a desired position by changing the laser power. The CD laser beam 28 is emitted on the optical plotting layer 17 with laser power which makes the heat sensitive material change in color at a desired position on the optical disc, for example, based on a control table which sets a relationship between strength/weakness of the laser power of the CD laser beam 28 and the change in color of the heat sensitive material. The position on the optical plotting layer 17 to be emitted with the laser based on the plotting data can be determined, for example, based on address information or the like preliminary provided in a pre-pit on the plotting guide track 24. Accordingly, the optical disc Da is plotted by heat discoloration of heated portions on the optical plotting layer 17 with optical spots of the CD laser beam 28. More specifically, the CD laser beam 28 is spotted on the second reflective layer 16, leading to heat the second reflective layer 16. The heated portions of the optical plotting layer 17 transferred with heat from the second reflective layer 16 change in color by the heat.

In the structure shown in FIG. 4B, as the heat sensitive material of the optical plotting layer 17 in each of the concave portions 31 changes in color by heat, the numerous concave portions 31 can function as pixels in an image. Therefore, though contrast (density) degrades to a certain degree, it is possible to plot clearly without line blur (fuzziness) and the like. On the other hand, in the structure shown in FIG. 4A, as the heat sensitive material of the optical plotting layer 17 on the flat portions 32 and the land 33 in addition to that of each concave portion 31 changes in color by heat, an image having sufficient contrast can be obtained. Further, by forming heat sensitive material which produces different color in each of the concave portions 31, it is possible to plot with multiple colors. A similar effect can be obtained by forming heat sensitive material which can produce different color by a track unit or a predetermined address.

Further, it is possible to obtain an address signal of the optical plotting layer 17 by the concave portions 31 and the flat portions 32, besides the tracking signal by the plotting guide track 24. Therefore, when the optical plotting layer 17 is plotted with the CD laser beam 28 and the image data is, for example, a bitmap type, the image data is converted to polar coordinates data, a plotting position may be defined based on a relationship between an actual position on the surface of the optical disc and a position instructed by an address of the optical plotting layer 17. When plotting, if positions of letters "DVD-R" pre-plotted on the optical disc Da is recognizable (or the letters "DVD-R" are plotted at predetermined positions), it is possible to alter the notation from "DVD-R" of the optical disc after finalization to "DVD-ROM" by plotting "OM" thereafter. Accordingly, it is possible to plot such as DVD-ROM disc after recording information on a DVD-R disc on which nothing has been recorded.

As described above, according to the embodiment, it is possible to plot accurately with the laser beam emitted from the recording surface A side by using the plotting guide track 24 as tracking and focusing for plotting. Further, it is possible to plot clearly having no line blur (fuzziness) and the like by changing the heat sensitive material of the optical plotting layer 17 in the plotting guide track 24 by heat. Still further, it is possible to plot at a desired position on the optical plotting layer 17 correctly by providing the plotting guide track 24. Still further, by providing the second substrate 15 between the optical plotting layer 17 and the information recording layer 12, it is possible to prevent heat effect when information is recorded on the information recording layer 12 from being transferred to the optical plotting layer 17. Moreover, by forming the plotting guide track in the discontinuous shape, thermal diffusion around the emitted point of the laser beam becomes discontinuous when the laser beam is emitted for color-forming the heat sensitive material formed on the concave portions 31. Therefore, there is an advantage in which a clear image having less blur can be plotted.

Figure 5:
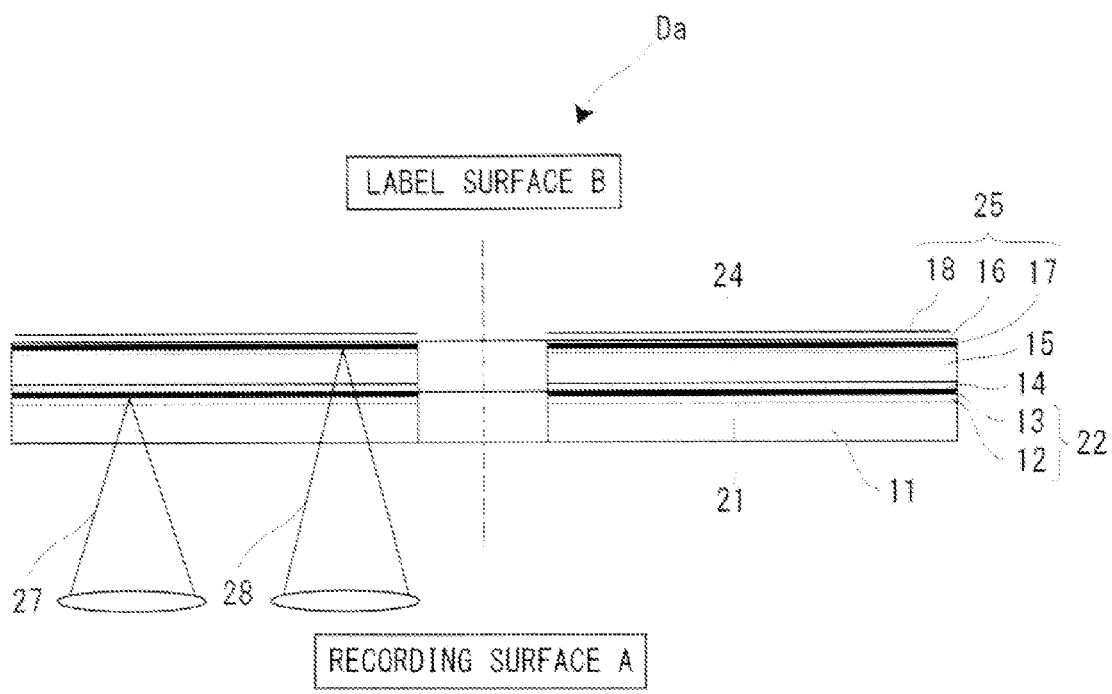
FIG. 5 is a diagramic sectional view of an optical disc (a DVD-R) according to a modified example of the first embodiment.
Figure 6:
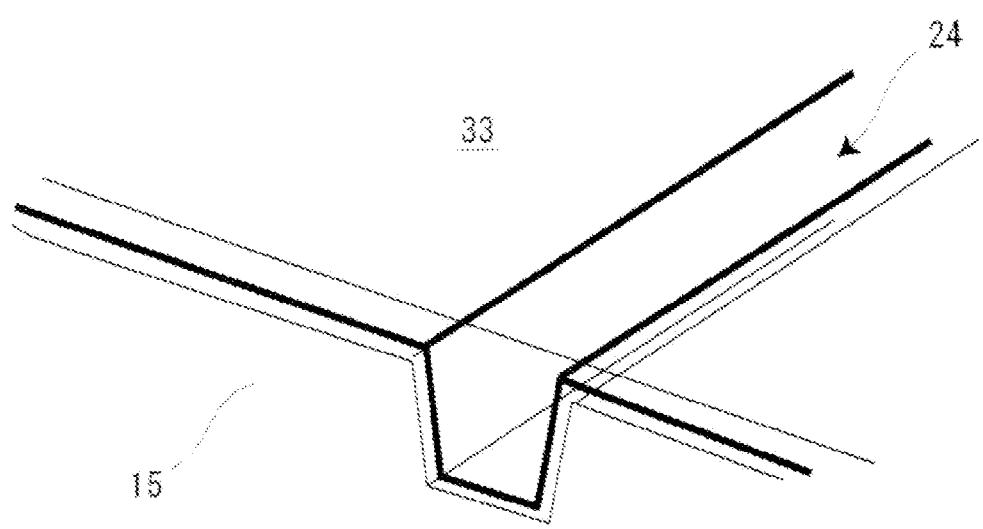
FIG. 6 is a partially enlarged perspective view around a plotting guide track according to the modified example of the first embodiment.

As a modified example of the first embodiment, the second reflective layer 16 may be formed between the optical plotting layer 17 and the protective layer 18 (see FIG. 5). In this case, it is preferable that the second reflective layer 16 be configured such that it can transmit a visible light. Accordingly, in a case that the plotting guide track 24 is used as tracking and focusing for plotting, a sufficient reflective light can be obtained, the heat sensitive material of the optical plotting layer 17 can be heated directly and the plotting laser power can be smaller. Further, visibility of a plotting result is not impaired. Still further, the plotting guide track 24 may be formed as a continuous groove as same as the recording/reproducing guide track (see FIG. 6). The optical plotting layer 17 can be plotted while the plotting guide track 24 is tracked. Therefore, it is possible to plot without using the recording/reproducing guide track 21 provided on the information recording layer 12, and to configure to separate the optical plotting layer 17 from the information recording layer 12 adequately.

Figure 7:
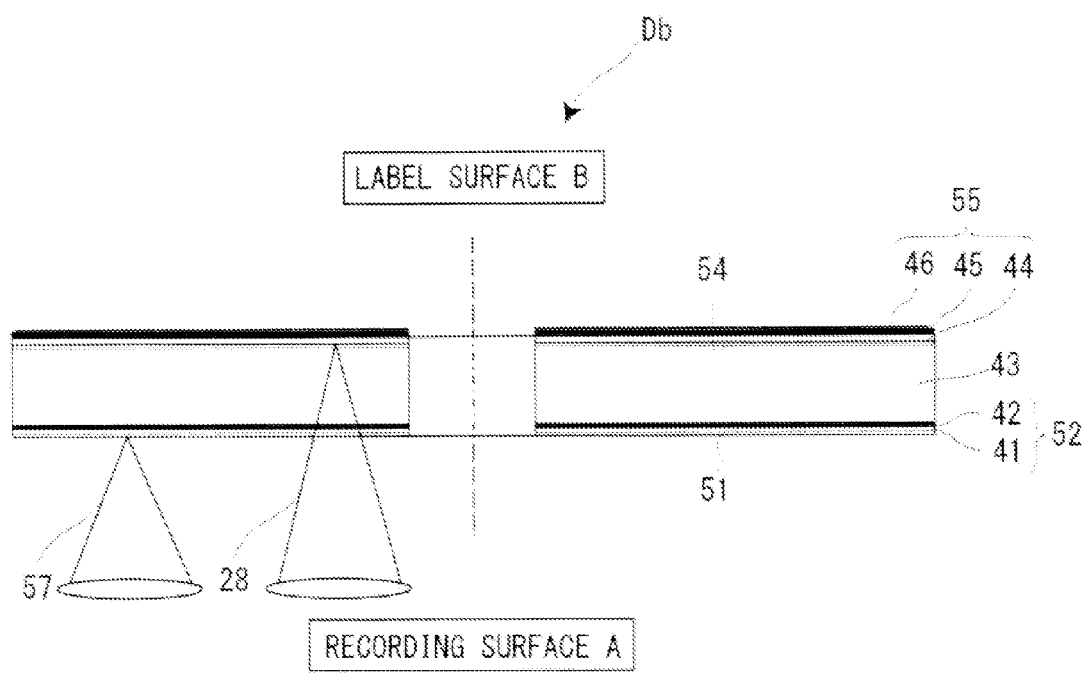
FIG. 7 is a diagramic sectional view of an optical disc (a BD) according to the second embodiment.

Referring to FIG. 7, the second embodiment will be explained, in which an optical disc Db is configured with a Blu-ray Disc and differences from the first embodiment will be mainly described. The optical disc Db has, from the recording surface A-side in turn, an information recording layer 41, the first reflective layer 42, a substrate 43, the second reflective layer 44, an optical plotting layer 45 and a protective layer 46 in layers (a protective layer at the recording surface A-side is omitted). A recording/reproducing guide track 51 is formed on the information recording layer 41, and the first reflective layer 42 and the information recording layer 41 make up of a Blue-ray Disc layer 52 used for recording/reproducing with a Blu-ray Disc semi-conductor laser. Also, as same as the first embodiment, a plotting guide track 54 is formed on the optical plotting layer 45, and the second reflective layer 44, the optical plotting layer 45 and the protective layer 46 make up of an image forming layer 55 used for plotting with a CD semi-conductor laser.

Also in this case, the first reflective layer 42 is made up of a wavelength selectivity transmitting reflective film. The first reflective layer 42 reflects a Blu-ray Disc laser beam 57 (405 nm) transmitted through the information recording layer 41 and transmits the CD laser beam 28 (780 nm). The optical plotting layer 45 (the second reflective layer 44) is plotted with the CD laser beam 28 based on plotting data while the CD laser beam 28 tracks on the plotting guide track 54.

Thus, even if the optical disc Db is a Blu-ray Disc, it is possible to plot a clear image having high plotting accuracy viewed from the label surface B-side by the plotting guide track 54. It is also possible to configure to separate the optical plotting layer 45 from the information recording layer 41 properly.

Figure 8:
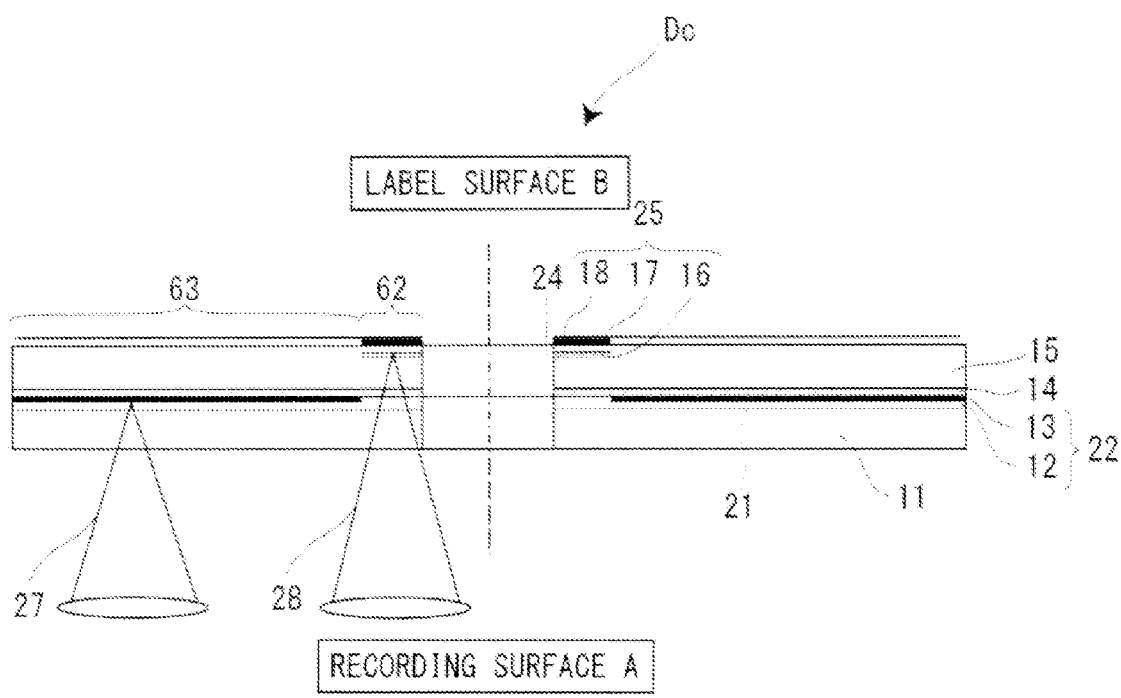
FIG. 8 is a diagramic sectional view of an optical disc (a DVD-R) of the third embodiment.

Referring to FIG. 8, the third embodiment of an optical disc Dc made up of a DVD-R will be explained, in which differences from the first embodiment will be mainly described. In this embodiment, the image forming layer 25 is formed in an area, for example, a clamp area 62 other than a data area 61. In other words, the DVD layer 22 having the information recording layer 12 and the first reflective layer 13 is formed in the data area 61 of the optical disc Dc, and the image forming layer 25 having the second reflective layer 16 and the optical plotting layer 17 (the protective layer 16) is formed in the clamp area 62.

As same as the first embodiment, the recording/reproducing guide track 21 is formed in the data area 61 of the information recording layer 12 and the plotting guide track 24 is formed in the clamp area 62 of the optical plotting layer 17. The optical plotting layer 17 (the second reflective layer 16) is plotted with the CD laser beam 28 based on plotting data while the CD laser beam 28 tracks on the plotting guide track 24. Note that the image forming layer may be formed at the same laminated position of the above DVD layer.

Thus, as the recording/reproducing DVD layer 22 and the image forming layer 25 having the optical plotting layer 17 are not overlapped, it is possible to plot on the optical plotting layer 17 without giving any influence on the information recording layer 12, the first reflective layer 13 and the like. Further, it is possible to plot a clear image having high plotting accuracy by the plotting guide track 54. The structure of the above third embodiment can be applied to a Blu-ray Disc.

The invention claimed is:

1. An optical disc comprising:
 an optical plotting layer that is formed at a label surface side and on which an image is formed by heat change with a laser beam emitted from a recording surface side;
 a protective layer that is formed at the label surface side of the optical plotting layer, protects the optical plotting layer, and through which the image can be viewed from the label surface side;
 a substrate that supports the protective layer and the optical plotting layer; and
 a guide track that is formed on the optical plotting layer so as to be intermittent in a guide direction,
 wherein a heat sensitive material forming the optical plotting layer being formed only on a plurality of concave portions of the guide track.

2. An optical disc comprising:
 an optical plotting layer that is formed at a label surface side and on which an image is formed by heat change with a laser beam emitted from a recording surface side;
 a protective layer that is formed at the label surface side of the optical plotting layer, protects the optical plotting layer, and through which the image can be viewed from the label surface side;
 a substrate that supports the protective layer and the optical plotting layer;
 a guide track that is formed on the optical plotting layer so as to be intermittent in a guide direction; and
 a reflective layer between the protective layer and the optical plotting layer, wherein the reflective layer is configured such that it can transmit a visible light,
 wherein heat sensitive material forming the optical plotting layer being formed at least on a plurality of concave portions of the guide track.

3. The optical disc according to claim 1, further comprising a reflective layer between the optical plotting layer and the substrate.

4. The optical disc according to claim 1, further comprising a bonded substrate laminated at the recording surface side of the substrate, and an information recording layer formed at a bonded side of the bonded substrate; wherein the information recording layer has a wavelength selectivity transmitting reflective film.

5. The optical disc according to claim 1, further comprising an information recording layer formed at the recording surface side of the substrate, wherein the information recording layer has a wavelength selectivity transmitting reflective film.

6. The optical disc according to claim 1, wherein the protective layer and the optical plotting layer are formed in an area other than a data area.

7. The optical disc according to claim 1, wherein the optical plotting layer is made up of heat sensitive material mixed with a metallic particle.

8. The optical disc according to claim 1, wherein the protective layer serves as a printing layer capable of being printed by a printing apparatus.

9. The optical disc according to claim 1, wherein the protective layer serves as a printing layer capable of being printed by a printing apparatus, and color of non-plotted optical plotting layer is tinged with white.

10. An optical disc apparatus comprising: an optical disc as set forth in claim 1; and an optical pickup for emitting a laser beam on the information recording layer to record and/or reproduce information, and emitting a laser beam on the optical plotting layer to plot the image.

11. The optical disc apparatus according to claim 10, wherein wavelengths of the laser beam emitted on the information recording layer and of the laser beam emitted on the optical plotting layer are different each other.

12. An optical disc apparatus according to claim 10, wherein the laser beam is emitted based on the guide track to plot the image on the optical plotting layer.

* * * * *